(12) United States Patent
Luo

(10) Patent No.: US 11,468,125 B2
(45) Date of Patent: Oct. 11, 2022

(54) RESOURCE SEARCH METHOD AND RELATED PRODUCT

(71) Applicant: SHENZHEN HEYTAP TECHNOLOGY CORP., LTD., Guangdong (CN)

(72) Inventor: Yue Luo, Guangdong (CN)

(73) Assignee: SHENZHEN HEYTAP TECHNOLOGY CORP., LTD., Shenzhen (CN)

(*) Notice: Subject to any disclaimer, the term of this patent is extended or adjusted under 35 U.S.C. 154(b) by 204 days.

(21) Appl. No.: 16/636,630

(22) PCT Filed: Aug. 31, 2017

(86) PCT No.: PCT/CN2017/100087
§ 371 (c)(1),
(2) Date: Feb. 4, 2020

(87) PCT Pub. No.: WO2019/041284
PCT Pub. Date: Mar. 7, 2019

(65) Prior Publication Data
US 2020/0183981 A1 Jun. 11, 2020

(51) Int. Cl.
*G06F 17/30* (2006.01)
*G06F 16/906* (2019.01)
(Continued)

(52) U.S. Cl.
CPC ...... *G06F 16/906* (2019.01); *G06F 16/90332* (2019.01); *G06F 16/90335* (2019.01); *G06F 16/9538* (2019.01)

(58) Field of Classification Search
CPC .... G06F 16/3334; G06F 16/951; G06F 16/38; G06F 16/3335; G06F 16/9577; G06F 16/24578
(Continued)

(56) References Cited

U.S. PATENT DOCUMENTS 8,612,470 B1 * 12/2013 Fushman ............ G06F 16/9535
707/767
9,043,351 B1 * 5/2015 Krynski .............. G06F 16/9535
709/227
(Continued)

FOREIGN PATENT DOCUMENTS

CN 101984423 A 3/2011
CN 104598511 A 5/2015
(Continued)

OTHER PUBLICATIONS

English Translation of International Search Report for PCT/CN2017/100087 dated May 25, 2018.
(Continued)

*Primary Examiner* — Daniel A Kuddus
(74) *Attorney, Agent, or Firm* — Young Basile Hanlon & MacFarlane, P.C.

(57) ABSTRACT

A resource search method and a related product. The method comprises: receiving a search request sent by a mobile terminal, the search request including a target search word; searching in a preset application library based on a first search algorithm and the target search word to obtain a first search result set; when a conversion rate of the target search result set is less than a first preset threshold, searching in the preset application library based on a second search algorithm and the target search word to obtain a second search result set; performing merge according to the first search result set and the second search result set to obtain a third search result set; and pushing the third search result set to the mobile terminal and instructing the mobile terminal to display the third search result set.

16 Claims, 8 Drawing Sheets

(51) Int. Cl.
*G06F 16/903* (2019.01)
*G06F 16/9032* (2019.01)
*G06F 16/9538* (2019.01)

(58) Field of Classification Search
USPC .................. 707/690, 696, 673, 679, 711
See application file for complete search history.

(56) References Cited

U.S. PATENT DOCUMENTS

| | | | |
|---|---|---|---|
| 2007/0082859 A1* | 4/2007 | Stover .................. | A61P 9/10 514/43 |
| 2007/0092859 A1* | 4/2007 | Watts ................... | G09B 5/00 434/322 |
| 2007/0143345 A1* | 6/2007 | Jones .................. | G06F 16/288 |
| 2010/0036617 A1* | 2/2010 | Mathews ............. | G01N 29/069 702/34 |
| 2012/0041819 A1* | 2/2012 | Ramer ................ | G06Q 30/0251 705/14.46 |
| 2013/0325892 A1 | 12/2013 | Edwards et al. | |
| 2016/0132771 A1* | 5/2016 | Shetty ................ | G06Q 30/0631 706/46 |
| 2019/0034976 A1* | 1/2019 | Hamedi .............. | G06Q 30/0243 |
| 2020/0028782 A1* | 1/2020 | Li ....................... | H04L 41/147 |
| 2020/0029240 A1* | 1/2020 | Li ....................... | H04W 28/0289 |

FOREIGN PATENT DOCUMENTS

| | | | |
|---|---|---|---|
| CN | 104915458 A | | 9/2015 |
| CN | 105930376 | * | 1/2016 |
| CN | 105426508 A | | 3/2016 |
| CN | 105912680 | * | 8/2016 |
| CN | 105912680 A | | 8/2016 |
| CN | 105930376 A | * | 9/2016 |
| CN | 105930376 A | | 9/2016 |
| CN | WO2019041285 | * | 3/2017 |
| EP | 3667508 A1 | * | 6/2020 |

OTHER PUBLICATIONS

Communication pursuant to Article 94(3) EPC for EP Application 17923091.7 dated Jul. 26, 2021. (9 pages).
Indian Examination Report for IN Application 202017010190 dated Nov. 1, 2021. (6 pages).
Search Report for EP application 17923091.7 dated May 18, 2020.

* cited by examiner

RESOURCE SEARCH METHOD AND RELATED PRODUCT

CROSS-REFERENCE TO RELATED APPLICATION(S)

This application is a 371 application of International Application No. PCT/CN2017/100087, filed on Aug. 31, 2017, the entire disclosure of which is hereby incorporated by reference.

TECHNICAL FIELD

The present disclosure relates to a field of internet technologies, and more particularly, to a resource search method and a related product.

BACKGROUND

With the popularization of mobile terminals (mobile phones, tablet computers, etc.), mobile terminals, which have more and more powerful functions, can support more and more applications. Developing in a diversified and personalized direction, the mobile terminals are becoming significant electronic products in users' lives.

At present, various applications (APPs) will be installed on the mobile terminals. Generally, there are a variety of applications in software stores, and a user can search for a desired application and download it from the software store.

SUMMARY

Embodiments according to the present disclosure provide a resource search method and a related product.

An embodiment according to a first aspect of the present disclosure provides a resource search method, including: receiving a search request sent by a mobile terminal, the search request comprising a target search word; searching in a preset application library based on a first search algorithm and the target search word, so as to obtain a first search result set; when a conversion rate of the first search result set is lower than a first preset threshold, searching in the preset application library based on a second search algorithm and the target search word, so as to obtain a second search result set; performing a merge according to the first search result set and the second search result set, so as to obtain a third search result set; and pushing the third search result set to the mobile terminal and instructing the mobile terminal to display the third search result set on a display interface of the mobile terminal.

An embodiment according to a second aspect of the present disclosure provides a resource search apparatus, including: a receiving unit, a first searching unit, a second searching unit, a merging unit and an executing unit. The receiving unit is configured to receive a search request sent by a mobile terminal, the search request comprising a target search word. The first searching unit is configured to search in a preset application library based on a first search algorithm and the target search word, so as to obtain a first search result set. The second searching unit is configured to, when a conversion rate of the first search result set is lower than a first preset threshold, search in the preset application library based on a second search algorithm and the target search word, so as to obtain a second search result set. The merging unit is configured to perform a merge according to the first search result set and the second search result set, so as to obtain a third search result set. The executing unit is configured to push the third search result set to the mobile terminal and to instruct the mobile terminal to display the third search result set on a display interface of the mobile terminal.

An embodiment according to a third aspect of the present disclosure provides a server, including: a processor and a memory; and one or more programs stored in the memory and configured to be executed by the processor. The one or more programs includes instructions applied to a part or all of the steps as described in the first aspect.

An embodiment according to a fourth aspect of the present disclosure provides a computer readable storage medium, configured to store a computer program. The computer program causes a computer to execute instructions of a part or all of the steps as described in the embodiment according to the first aspect of the present disclosure.

An embodiment according to a fifth aspect of the present disclosure provides a computer program product, including a non-transitory computer readable storage medium storing a computer program. The computer program is configured to cause a computer to execute a part or all of the steps as described in the embodiment according to the first aspect of the present disclosure. The computer program product may be a software installation package.

BRIEF DESCRIPTION OF DRAWINGS

In order to clearly illustrate technical solutions of embodiments of the present disclosure or in the prior art, a brief description of drawings used in the embodiments or the prior art is given below. Obviously, the drawings in the following descriptions are only part embodiments of the present disclosure, and for those skilled in the art, other drawings can be obtained according to these drawings without creative labor.

DETAILED DESCRIPTION

Figure 1:
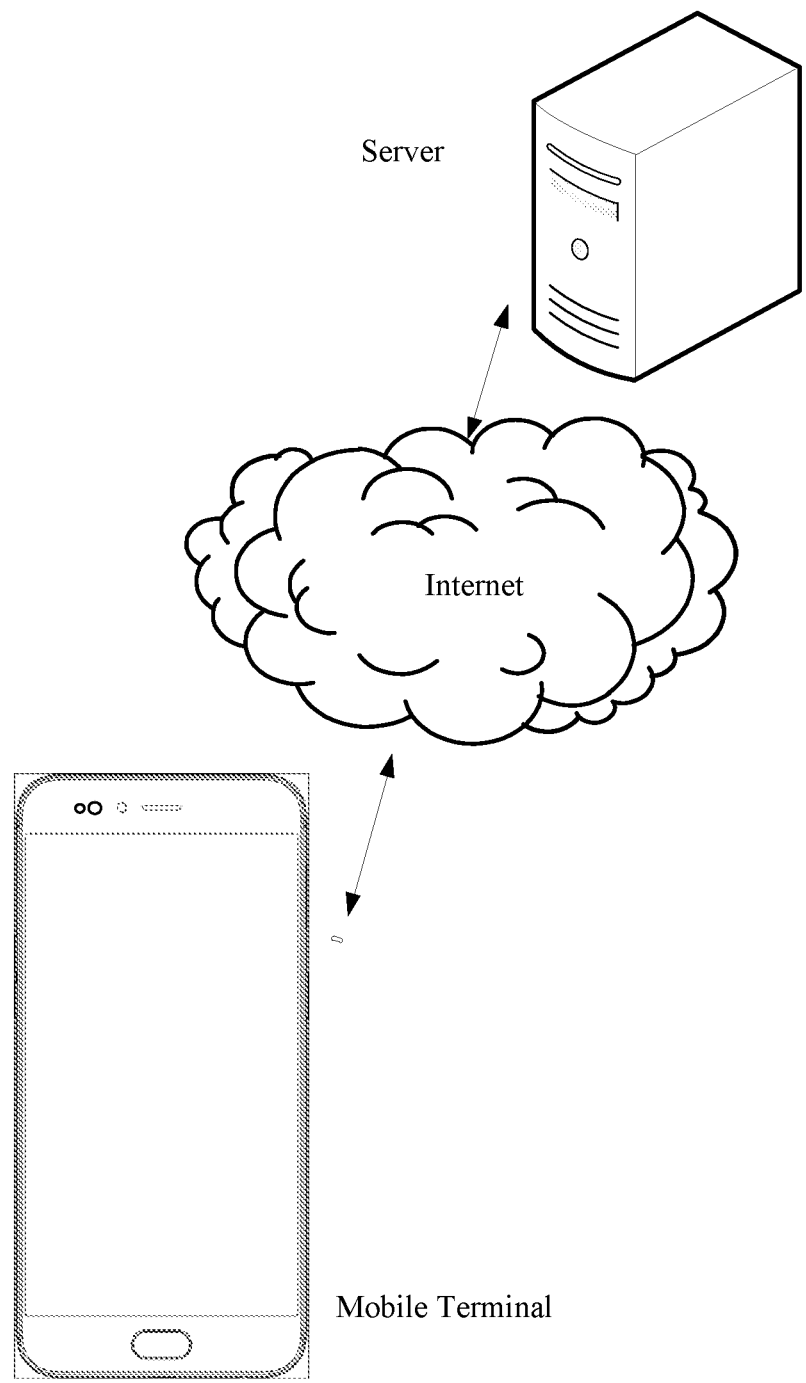
FIG. 1 is a network architecture diagram of a resource search system according to an embodiment of the present disclosure.

Normally, for example, in a process of searching in a software store, poor search results may be presented after a certain search word is entered. In this way, it is difficult for a user to quickly find a desired resource, and thus the user experience is adversely affected. Therefore, embodiments of the present disclosure provide a resource search method and a related product, which may improve search results and increase chances for the user to find the desired resource.

In order to enable those skilled in the art to understand the solutions of the present disclosure, technical solutions in the embodiments of the present disclosure will be described clearly and completely with reference to accompanying drawings. Obviously, the embodiments described here are only a part of embodiments of the present disclosure and are not all embodiments of the present disclosure. Based on the embodiments of the present disclosure, other embodiments obtained by those skilled in the art without creative labor would fall within the scope of the present disclosure.

Terms "first", "second" and the like in the description, claims and accompanying drawings of the present disclosure are used for distinguishing between different objects, rather than describing a particular order. Furthermore, terms "include", "have" as well as any variation thereof, are intended to cover non-exclusive inclusions. For example, a process, a method, a system, a product, or an apparatus that includes a series of steps or units is not limited to steps or units listed, but may alternatively include steps or units not listed, or may alternatively include steps or units inherent to the process, the method, the product, or the apparatus.

Reference herein to "an embodiment" means that a particular feature, structure or characteristic described in combination with the embodiment may be included in at least one embodiment of the present disclosure. The phrase appearing in different places of the specification neither necessarily refers to the same embodiment, nor refers to separate or alternative embodiments mutually exclusive of other embodiments. It is explicitly and implicitly understood by those skilled in the art that the embodiments described herein may be combined with other embodiments.

The mobile terminal according to the embodiment of the present disclosure may include various handheld devices, vehicle-mounted devices, wearable devices, computing devices or other processing devices connected to a wireless modem, and various forms of user equipment (UE), mobile stations (MS), terminal devices, and the like, which have wireless communication functions. For convenience of description, the above-mentioned devices are collectively referred to as the mobile terminal.

It should be noted that, in the embodiments of the present disclosure, a search result may be understood as an application resource. The application resource mainly includes a download link. When a user clicks the download link, a resource indicated by the application resource may be downloaded. A search result set may contain a plurality of search results, each search result may correspond to one application resource, and the user may download a corresponding application through the application resource. Each search result may correspond to a conversion rate, which may be understood as: a ratio of the number of download times of an application to the number of search times of the application. For example, when the number of download times of an application is 6, and the number of search times of the application is 10, the conversion rate is 60%. Of course, the search result set may also correspond to a conversion rate, which may be an average value or a maximum value of conversion rates of first K search results in the search result set, where K is a positive integer. For example, the conversion rate of a certain search result set may be a conversion rate of the first application resource. The aforementioned conversion rate may also be a conversion rate within a specified time period. The specified time period may be set by the user or by default in a system.

It should be noted that, in the embodiments of the present disclosure, a first search algorithm may be one of or a combination of at least two of the following algorithms: pomegranate algorithm, scindapsus algorithm, Google panda, penguin update, neural network algorithm, genetic algorithm, support vector machine algorithm, ant colony optimization, and the like. A second search algorithm may be one of or a combination of at least two of the following algorithms: pomegranate algorithm, scindapsus algorithm, Google panda, penguin update, neural network algorithm, genetic algorithm, support vector machine algorithm, ant colony optimization, and the like.

FIG. 1 is network architecture of a resource search system for implementing a resource search method according to an embodiment of the present disclosure. The network architecture may include a server and a mobile terminal. The server may be a server used for resource search, or a server with a resource search function. The server may be a cloud server, a local server, or a third-party server. In detail, the server may receive a search request sent by the mobile terminal, the search request including a target search word; search in a preset application library based on the first search algorithm and the target search word, so as to obtain a first search result set; when a conversion rate of the first search result set is lower than a first preset threshold, search in the preset application library based on the second search algorithm and the target search word, so as to obtain a second search result set; perform a merge according to the first search result set and the second search result set, so as to obtain a third search result set; and push the third search result set to the mobile terminal and instruct the mobile terminal to display the third search result set on a display interface of the mobile terminal.

Figure 2:
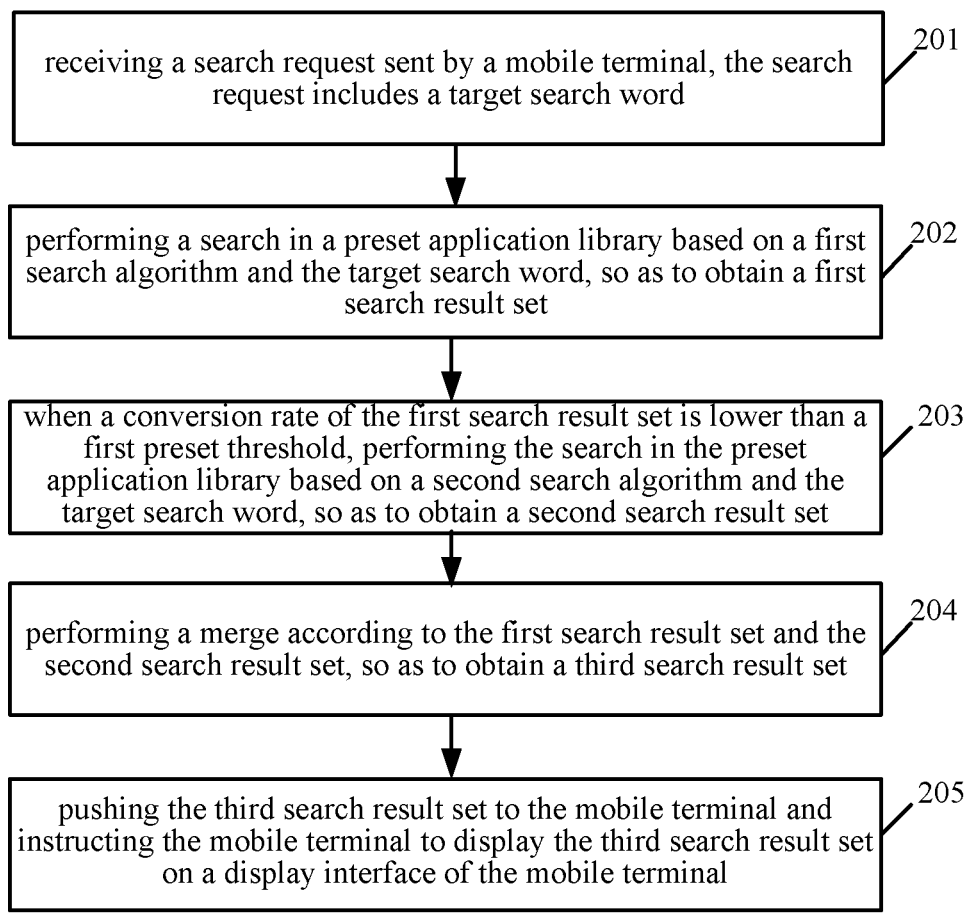
FIG. 2 is a schematic flowchart of a resource search method according to an embodiment of the present disclosure.

On the basis of the network architecture of the resource search system as illustrated in FIG. 1, reference may be made to FIG. 2, which is a schematic flowchart of a resource search method according to an embodiment of the present disclosure. The resource search method described in this embodiment includes the followings.

At block 201, a search request sent by a mobile terminal is received, and the search request includes a target search word.

The target search word may be a sentence, a word, or several words. For example, the target search word may be "WeChat", "farmers weeding at noon", or "WeChat oppo". The embodiment of the present disclosure may be applied to downloading applications, for example, in a software store or an App store. For instance, in the software store, the mobile terminal may input the target search word in a search bar of a page in the software store, and generate the search request including the target search word. The server may receive the search request, and perform a search according to the target search word.

At block 202, a search is performed in a preset application library based on a first search algorithm and the target search word, so as to obtain a first search result set.

The preset application library may include a plurality of application resources, and may be set by the server before block 201. The first search algorithm may be a search algorithm in the server. The server searches in the preset application library based on the first search algorithm and the target search word, and may find at least one search result corresponding to the target search word. All the search results or a part of the search results top-ranked in the search results may form the first search result set.

Alternatively, performing the search in the preset application library based on the first search algorithm and the target search word at block 202 may include the followings.

At block 21, an associated word corresponding to the target search word is determined.

At block 22, a search word set is formed with the target search word and the associated word.

At block 23, the search is performed in the preset application library based on the first search algorithm and the search word set.

The associated word may be a near-synonym, a synonym or an associative word of the target search word. The server may identify the target search word to obtain a target keyword. The keyword may be a character or a word. Furthermore, the associated word corresponding to the target keyword may be determined according to a preset mapping relationship between keywords and associated words, the search word set is formed of the target search word and the associated word, and the search is performed in the preset application library based on the first search algorithm and the search word set.

At block 203, when a conversion rate of the first search result set is lower than a first preset threshold, the search is performed in the preset application library based on a second search algorithm and the target search word, so as to obtain a second search result set.

The first preset threshold may be set by the user or by default in the system. The second search algorithm, which may be different from the first search algorithm, may be a backup search algorithm, or a search algorithm of a third-party application. When the conversion rate of the first search result set is lower than the first preset threshold, the server may search in the preset application library based on the second search algorithm and the target search word, so as to obtain the second search result set. The second search result set may include a plurality of search results.

Alternatively, the conversion rate of the first search result set is an average value or a maximum value of conversion rates of first K search results in the first search result set, K being a positive integer.

Alternatively, when the conversion rate of the first search result set is higher than or equal to the first preset threshold, the first search result set is pushed to the mobile terminal, and the mobile terminal is instructed to display the first search result set on the display interface of the mobile terminal.

At block 204, a merge is performed according to the first search result set and the second search result set, so as to obtain a third search result set.

Since the first search result set and the second search result set are obtained on the basis of different search algorithms, a certain intersection may exist between the first search result set and the second search result set. Consequently, a merge may be performed on the first search result set and the second search result set to obtain the third search result set. The process of the merge may be implemented as follows.

Alternatively, performing the merge according to the first search result set and the second search result set, so as to obtain the third search result set at block 204 may include the followings.

At block A1, first N search results are selected from the first search result set, N being a positive integer.

At block A2, first M search results are selected from the second search result set, M being a positive integer.

At block A3, a union of the N search results and the M search results is determined, so as to obtain the third search result set.

Typically, a search algorithm obtains search results according to a certain order, and therefore, it may be considered that the higher the ranking of a search result, the more likely the search result to be downloaded. Therefore, the first N search results may be selected from the first search result set, N being a positive integer, and the first M search results may be selected from the second search result set, M being a positive integer. Since a certain intersection may exist between the N search results and the M search results, the union of the N search results and the M search results may be determined, so as to obtain the third search result set. Conversion rates of the search results bottom-ranked in the search result set are low, or may be understood as less likely to be needed by the user. Accordingly, the search results bottom-ranked may be discarded, and only the search results top-ranked in the first search result set and the second search result set may be taken as the third search result set, thereby reducing the number of search results to be displayed, and improving the user experience.

Alternatively, performing the merge according to the first search result set and the second search result set, so as to obtain the third search result set at block 204 may include the followings.

At block B1, an intersection of the first search result set and the second search result set is determined, so as to obtain P search results, P being a positive integer.

At block B2, Q search results each having a conversion rate higher than a second preset threshold and excluded from the P search results are determined in the second search result set, Q being a positive integer.

At block B3, the P search results and the Q search results are determined as the third search result set.

From the above, it may be known that there is a certain intersection between the first search result set and the second search result set. Therefore, the intersection between the first search result set and the second search result set may be determined to obtain the P search results, P being a positive integer, and the Q search results each having the conversion rate higher than the second preset threshold and excluded from the P search results are determined in the second search result set, Q being a positive integer. The second preset threshold may be determined by the user or by default in the system. Furthermore, the P search results and the Q search results may be used as the third search result set. Since the conversion rate of the first search result set is lower than the first preset threshold, it may be considered that a reliability of the first search algorithm is low when the search is performed according to the target search word, and thus the search depends more on the search results of the second search algorithm. In this way, shortcomings of the first search algorithm may be made up to a certain extent, and thus the user experience is improved on one hand, and the user may quickly find application resources he/she needs on the other hand.

At block 205, the third search result set is pushed to the mobile terminal, and the mobile terminal is instructed to display the third search result set on a display interface of the mobile terminal.

The server may push the third search result set to the mobile terminal and instruct the mobile terminal to display the third search result set on the display interface of the mobile terminal. In this manner, the user may view the third search result set through the display interface of the mobile terminal.

Alternatively, pushing the third search result set to the mobile terminal and instructing the mobile terminal to display the third search result set on the display interface of the mobile terminal at block 205 may include the followings.

At block 51, a conversion rate and a weight value of each search result set in the third search result set are determined.

At block 52, a target conversion rate is calculated for each search result set based on the conversion rate and the weight value of each search result set in the third search result set, so as to obtain a plurality of target conversion rates.

At block 53, a display order of the third search result set is determined based on the plurality of target conversion rates.

At block 54, the display order and the third search result set are pushed to the mobile terminal and the mobile terminal is instructed to display the third search result set on the display interface according to the display order.

The weight value of each search result is related to the corresponding search algorithm, and different search algorithms correspond to different weight values. Therefore, the weight value may be set for each search algorithm in advance, and the conversion rate and the corresponding weight value of each search result set in the third search result set may be determined. The above target conversion rate may be defined as the followings.

For search results in the third search result set that do not belong to the intersection of the first search result set and the second search result set: target conversion rate=weight value*conversion rate.

For example, if the weight value of the first search algorithm is 0.5 and the conversion rate of an application resource is 0.8, then the corresponding target conversion rate is 0.5*0.8=0.4

For search results in the third search result set that belong to the intersection of the first search result set and the second search result set: target conversion rate=(weight value 1*conversion rate 1+weight value 2*conversion rate 2)/2.

The first search algorithm corresponds to the weight value 1 and the conversion rate 1, and the second search algorithm corresponds to the weight value 2 and the conversion rate 2. For example, the weight value 1 of the first search algorithm is 0.4, the weight value 2 of the second search algorithm is 0.6, the conversion rate 1 of a certain application resource in the first search algorithm is 0.8, and the conversion rate 2 of the certain application resource in the second search algorithm is 0.7, then the target conversion rate is (0.4*0.8+0.6*0.7)/2=0.37.

Furthermore, the conversion rate and the corresponding weight value of each search result set in the third search result set may be determined to calculate the target conversion rate of the each search result set in the third search result set, such that the plurality of target conversion rates may be obtained, and the display order of the third search result set may be determined based on the plurality of target conversion rates. For example, the order of the plurality of target conversion rates ranked from high to low may be determined as the display order of the third search result set. The display order and the third search result set may be pushed to the mobile terminal, and the mobile terminal may be instructed to display the third search result set on the display interface according to the display order.

Alternatively, after block 205, the followings may be further included.

When a search result i in the third search result set is downloaded, the target search word is associated with an associated search word corresponding to the search result i, so as to prompt the user to search based on the associated search word when the target search word appears again, the search result i being any search result in the third search result set.

When the search result i in the third search result set is downloaded, and the search result i is any search result in the third search result set, it indicates that the third search result set includes resources to be downloaded, and further, the target search word may be associated with the associated search word corresponding to the search result i, so that when another user uses the same target search word to search, the user may be prompted to search based on the associated search word, thereby increasing the search speed and optimizing the search algorithm.

According to the resource search method described in the embodiment of the present disclosure, the server may receive the search request sent by the mobile terminal, the search request including the target search word; search in the preset application library based on the first search algorithm and the target search word, so as to obtain the first search result set; when the conversion rate of the first search result set is lower than the first preset threshold, search in the preset application library based on the second search algorithm and the target search word, so as to obtain the second search result set; perform the merge according to the first search result set and the second search result set, so as to obtain the third search result set; and push the third search result set to the mobile terminal and instruct the mobile terminal to display the third search result set on the display interface of the mobile terminal. In this way, when the search results obtained by searching based on the first search algorithm and the target search word are unsatisfying, the second search algorithm may be used for further search, thereby making up for the shortcomings of the first search algorithm, increasing the accuracy of the search results, and improving the user experience.

Figure 3:
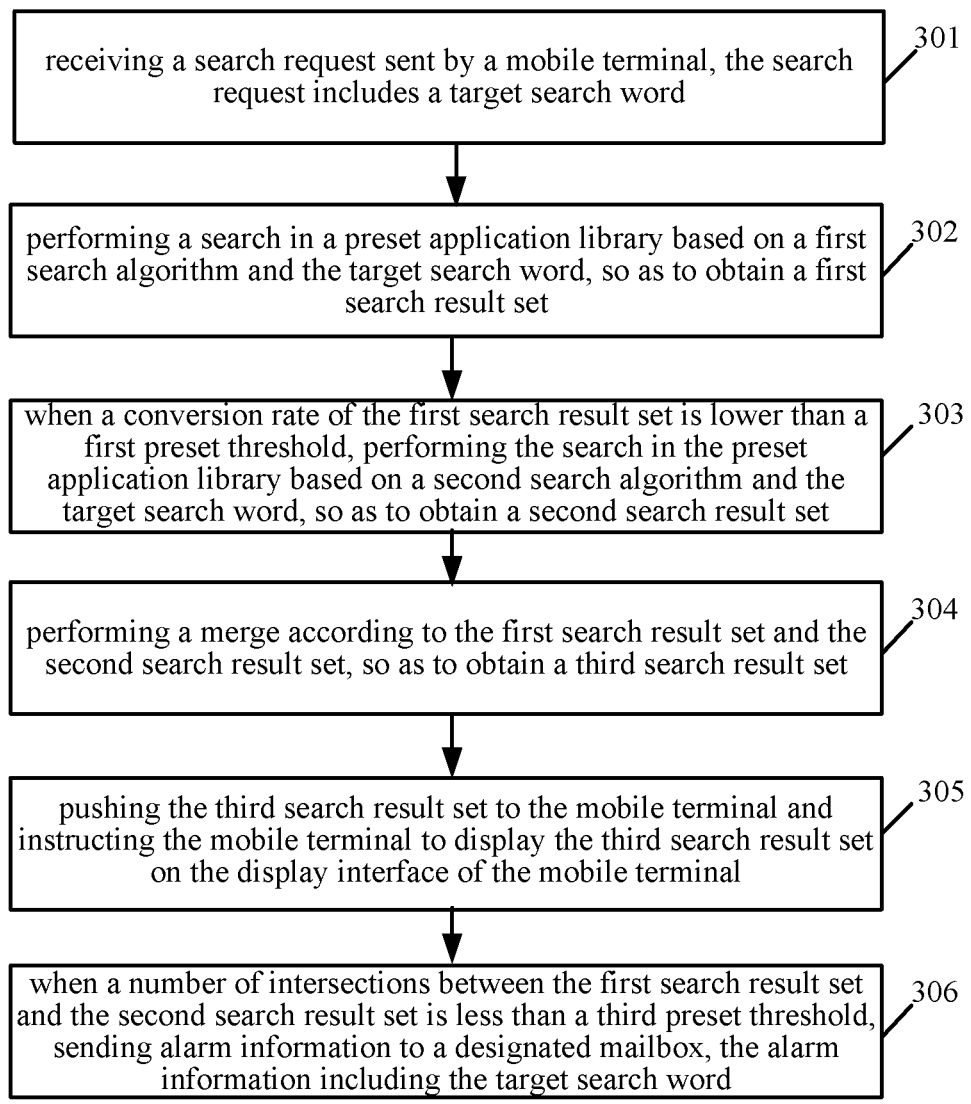
FIG. 3 is a schematic flowchart of a resource search method according to another embodiment of the present disclosure.

Consistent with the above, reference may be made to FIG. 3, FIG. 3 is a schematic flowchart of a resource search method according to an embodiment of the present disclosure. The resource search method according to this embodiment includes the followings.

At block 301, a search request sent by a mobile terminal is received, and the search request includes a target search word.

At block 302, a search is performed in a preset application library based on a first search algorithm and the target search word, so as to obtain a first search result set.

At block 303, when a conversion rate of the first search result set is lower than a first preset threshold, a search is performed in the preset application library based on a second search algorithm and the target search word, so as to obtain a second search result set.

At block 304, a merge is performed according to the first search result set and the second search result set, so as to obtain a third search result set.

At block 305, the third search result set is pushed to the mobile terminal, and the mobile terminal is instructed to display the third search result set on a display interface of the mobile terminal.

For detailed descriptions of blocks 301 to 305, reference may be made to corresponding blocks of the resource search method described in FIG. 2, which will not be repeated herein.

At block 306, when a number of intersections between the first search result set and the second search result set is less than a third preset threshold, alarm information is sent to a designated mailbox, the alarm information including the target search word.

The third preset threshold may be set by the user or by default in the system. The designated mailbox may be set by an administrator on the server side. The alarm information is configured to prompt performing an association on the target search word, so that the application resource that the user needs may be quickly found with the target search word. When the number of intersections between the first search result set and the second search result set is less than the third preset threshold, the server may send the alarm information to the designated mailbox. The alarm information includes the target search word.

According to the resource search method described in the embodiment of the present disclosure, the server may receive the search request sent by the mobile terminal, the search request including the target search word; search in the preset application library based on the first search algorithm and the target search word, so as to obtain the first search result set; when the conversion rate of the first search result set is lower than the first preset threshold, search in the preset application library based on the second search algorithm and the target search word, so as to obtain the second search result set; perform the merge according to the first search result set and the second search result set, so as to obtain the third search result set; push the third search result set to the mobile terminal and instruct the mobile terminal to display the third search result set on the display interface of the mobile terminal; and when the number of intersections between the first search result set and the second search result set is less than the third preset threshold, send the alarm information to the designated mailbox, the alarm information including the target search word. In this way, when the search results obtained by searching based on the first search algorithm and the target search word are unsatisfying, the second search algorithm may be used for further search. In addition, the administrator on the server side may be prompted to further improve the target search word, so as to enable the desired application resource to be quickly found with the target search word. Consequently, the shortcomings of the first search algorithm may be made up, the accuracy of the search results may be increased, and the user experience may be improved.

Figure 4:
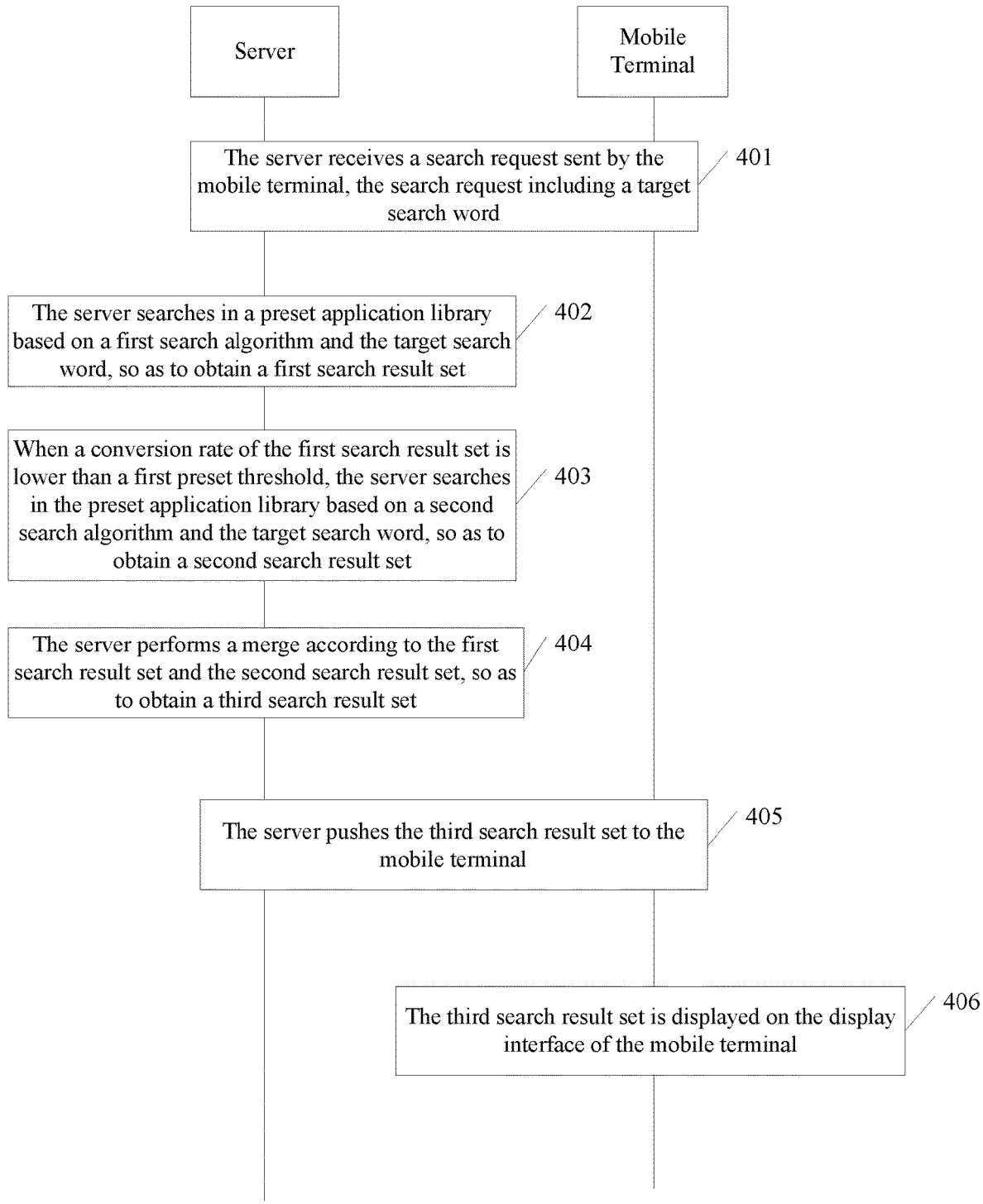
FIG. 4 is a schematic flowchart of a resource search method according to yet another embodiment of the present disclosure.

Consistent with the above, reference may be made to FIG. 4, FIG. 4 is a schematic flowchart of a resource search method according to an embodiment of the present disclosure. The resource search method according to this embodiment includes the followings.

At block 401, a server receives a search request sent by a mobile terminal. The search request includes a target search word.

At block 402, the server searches in a preset application library based on a first search algorithm and the target search word, so as to obtain a first search result set.

At block 403, when a conversion rate of the first search result set is lower than a first preset threshold, the server searches in the preset application library based on a second search algorithm and the target search word, so as to obtain a second search result set.

At block 404, the server performs a merge according to the first search result set and the second search result set, so as to obtain a third search result set.

At block 405, the server pushes the third search result set to the mobile terminal.

At block 406, the mobile terminal displays the third search result set on a display interface of the mobile terminal.

For detailed descriptions of blocks 401 to 406, reference may be made to corresponding blocks of the resource search method described in FIG. 2, which will not be repeated herein.

According to the resource search method described in the embodiment of the present disclosure, the server may receive the search request sent by the mobile terminal, the search request including the target search word; search in the preset application library based on the first search algorithm and the target search word, so as to obtain the first search result set; when the conversion rate of the first search result set is lower than the first preset threshold, search in the preset application library based on the second search algorithm and the target search word, so as to obtain the second search result set; perform the merge according to the first search result set and the second search result set, so as to obtain the third search result set; and push the third search result set to the mobile terminal and instruct the mobile terminal to display the third search result set on the display interface of the mobile terminal. In this way, when the search results obtained by searching based on the first search algorithm and the target search word are unsatisfying, the second search algorithm may be used for further search, thereby making up for the shortcomings of the first search algorithm, increasing the accuracy of the search results, and improving the user experience.

Figure 5A:
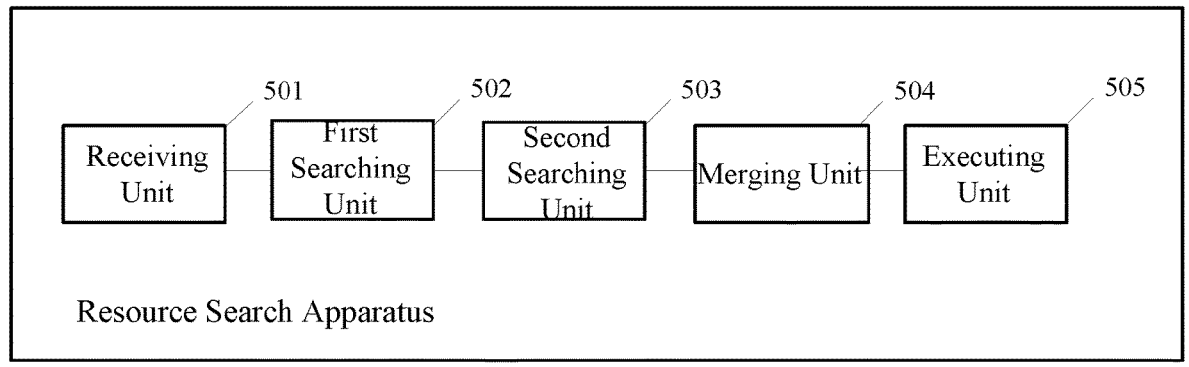
FIG. 5A is a schematic block diagram of a resource search apparatus according to an embodiment of the present disclosure.

FIG. 5A is a schematic block diagram of a resource search apparatus according to an embodiment. The resource search apparatus is applied to a server. The resource search apparatus includes a receiving unit 501, a first searching unit 502, a second searching unit 503, a merging unit 504 and an executing unit 505.

The receiving unit 501 is configured to receive a search request sent by a mobile terminal. The search request includes a target search word.

The first searching unit 502 is configured to search in a preset application library based on a first search algorithm and the target search word, so as to obtain a first search result set.

The second searching unit 503 is configured to, when a conversion rate of the first search result set is lower than a first preset threshold, search in the preset application library based on a second search algorithm and the target search word, so as to obtain a second search result set.

The merging unit 504 is configured to perform a merge according to the first search result set and the second search result set, so as to obtain a third search result set.

The executing unit 505 is configured to push the third search result set to the mobile terminal, and to instruct the mobile terminal to display the third search result set on a display interface of the mobile terminal.

Figure 5B:
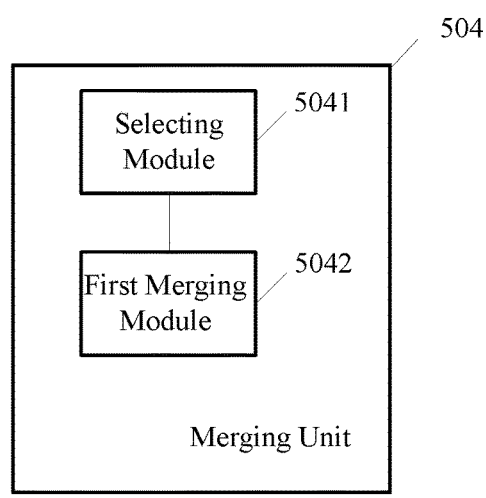
FIG. 5B is a schematic block diagram of a merging unit of the resource search apparatus described in FIG. 5A according to an embodiment of the present disclosure.

Alternatively, FIG. 5B is a detailed block diagram of the merging unit 504 of the resource search apparatus described in FIG. 5A. The merging unit 504 may include: a selecting module 5041 and a first merging module 5042.

The selecting module 5041 is configured to select first N search results from the first search result set, N being a positive integer.

The selecting module 5041 is further configured to select first M search results from the second search result set, M being a positive integer.

The first merging module 5042 is configured to determine a union of the N search results and the M search results, so as to obtain the third search result set.

Figure 5C:
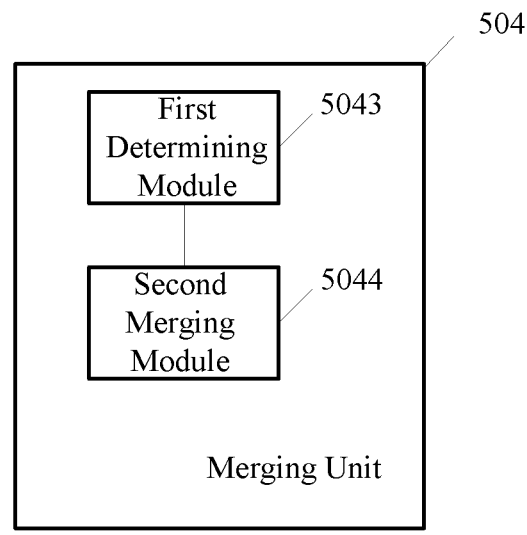
FIG. 5C is a schematic block diagram of a merging unit of the resource search apparatus described in FIG. 5A according to another embodiment of the present disclosure.

Alternatively, FIG. 5C is a detailed block diagram of the merging unit 504 of the resource search apparatus described in FIG. 5A. The merging unit 504 may include: a first determining module 5043 and a second merging module 5044.

The first determining module 5043 is configured to determine an intersection between the first search result set and the second search result set, so as to obtain P search results, P being a positive integer.

The first determining module 5043 is further configured to determine Q search results each having a conversion rate higher than a second preset threshold and excluded from the P search results, Q being a positive integer.

The second merging module 5044 is configured to determine the P search results and the Q search results as the third search result set.

Figure 5D:
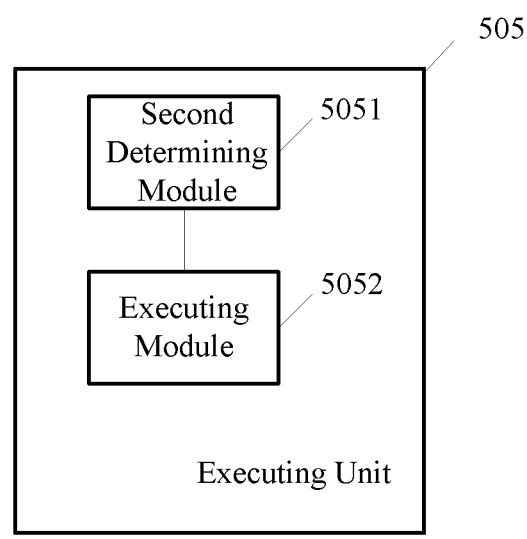
FIG. 5D is a schematic block diagram of an executing unit of the resource search apparatus described in FIG. 5A according to an embodiment of the present disclosure.

Alternatively, FIG. 5D is a detailed block diagram of the executing unit 505 of the resource search apparatus described in FIG. 5A. The executing unit 505 may include: a second determining module 5051 and an executing module 5052.

The second determining module 5051 is configured to determine a conversion rate and a weight value of each search result set in the third search result set.

The second determining module 5051 is further configured to calculate a target conversion rate for each search result set based on the conversion rate and the weight value of each search result set in the third search result set, so as to obtain the plurality of target conversion rates, and to determine a display order of the third search result set based on the plurality of target conversion rates.

The executing module 5052 is configured to push the display order and the third search result set to the mobile terminal and to instruct the mobile terminal to display the third search result set on the display interface according to the display order.

Figure 5E:
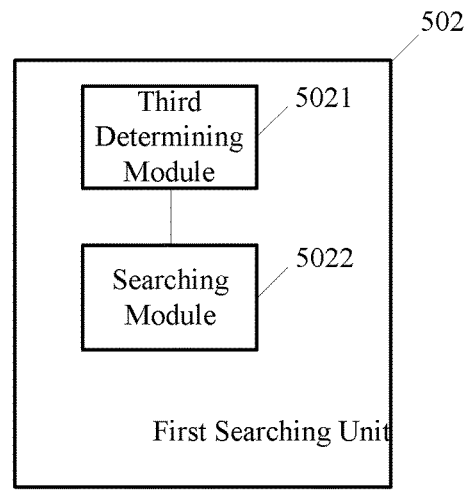
FIG. 5E is a schematic block diagram of a first searching unit of the resource search apparatus described in FIG. 5A according to an embodiment of the present disclosure.

Alternatively, FIG. 5E is a detailed block diagram of the first searching unit 502 of the resource search apparatus described in FIG. 5A. The first searching unit 502 may include: a third determining module 5021 and a searching module 5022.

The third determining module 5021 is configured to determine an associated word corresponding to the target search word.

The third determining module 5021 is further configured to form a search word set with the target search word and the associated word.

The searching module 5022 is configured to search in the preset application library based on the first search algorithm and the search word set.

Figure 5F:
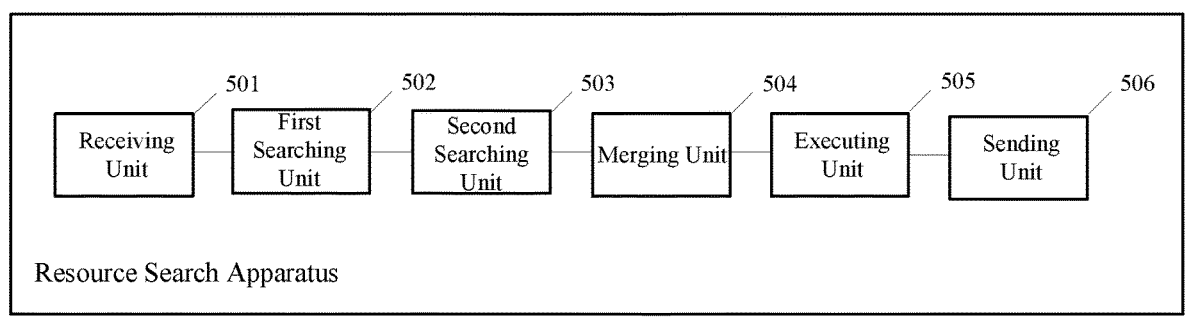
FIG. 5F is a schematic block diagram of a resource search apparatus according to another embodiment of the present disclosure.

Alternatively, FIG. 5F is a modified structure of the resource search apparatus as described in FIG. 5A. The apparatus may further include: a sending unit 506.

The sending unit 506 is configured to, when a number of intersections between the first search result set and the second search result set is less than a third preset threshold, send alarm information to a designated mailbox, the alarm information including the target search word.

Figure 5G:
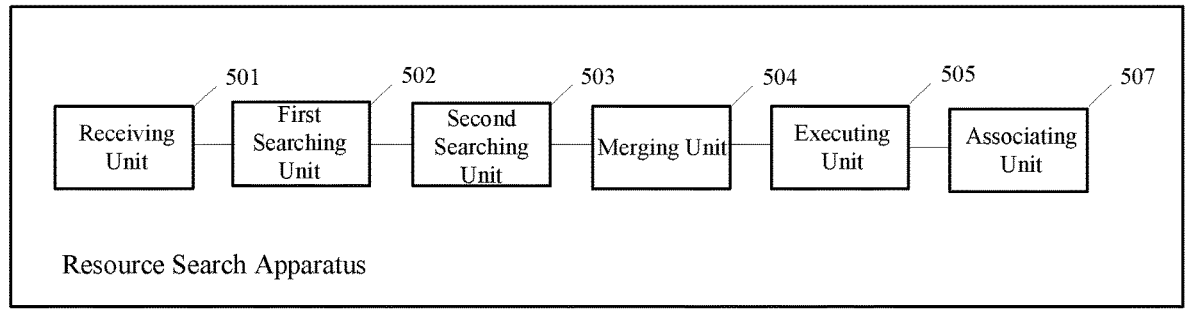
FIG. 5G is a schematic block diagram of a resource search apparatus according to yet another embodiment of the present disclosure.

Alternatively, FIG. 5G is a modified structure of the resource search apparatus as described in FIG. 5A. The apparatus may further include: an associating unit 507.

The associating unit 507 is configured to, when the search result i in the third search result set is downloaded, associate the target search word with an associated search word corresponding to the search result i, so as to prompt the user to search based on the associated search word when the target search word appears again, the search result i being any search result in the third search result set.

Alternatively, the second search algorithm is a search algorithm of a third-party application.

Alternatively, the conversion rate of the first search result set is an average value or a maximum value of conversion rates of first K search results in the first search result set, K being a positive integer.

The resource search apparatus according to the embodiment of the present disclosure may receive the search request sent by the mobile terminal, the search request including the target search word; search in the preset application library based on the first search algorithm and the target search word, so as to obtain the first search result set; when the conversion rate of the first search result set is lower than the first preset threshold, search in the preset application library based on the second search algorithm and the target search word, so as to obtain the second search result set; perform the merge according to the first search result set and the second search result set, so as to obtain the third search result set; and push the third search result set to the mobile terminal and instruct the mobile terminal to display the third search result set on the display interface of the mobile terminal. In this way, when the search results obtained by searching based on the first search algorithm and the target search word are unsatisfying, the second search algorithm may be used for further search, thereby making up for the shortcomings of the first search algorithm, increasing the accuracy of the search results, and improving the user experience.

It should be noted that the resource search apparatus according to the apparatus embodiment of the present disclosure is presented in the form of functional units. The term "unit" used herein should be understood in its broadest sense. The object configured to implement functions described by respective units may be for example, an integrated circuit ASIC and a single circuit, a processor and a (shared, dedicated or chipset) storage device configured to perform one or more software and firmware programs, a combined logic circuit and/or other suitable components that provide the functions described above.

Figure 6:
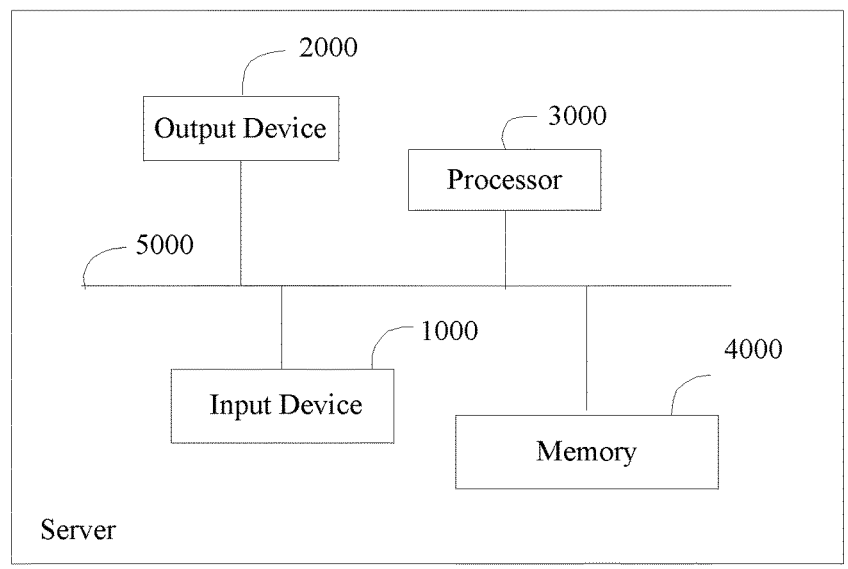
FIG. 6 is a schematic block diagram of a server according to an embodiment of the present disclosure.

For example, the function of receiving unit 501 which is configured to receive the search request sent by the mobile terminal, the search request including the target search word may be implemented by the server illustrated in FIG. 6. In detail, by calling executable program codes in a memory 4000 through a processor 3000, the server may receive the search request sent by the mobile terminal, the search request including the target search word.

FIG. 6 is a schematic block diagram of a server according to an embodiment of the present disclosure. The server according to the embodiment includes: at least one input device 1000; at least one output device 2000; at least one processor 3000, e.g., CPU; and a memory 4000. The input device 1000, the output device 2000, the processor 3000 and the memory 4000 are connected through a bus 5000.

The input device 1000 may be a touch panel, a physical button, or a mouse.

The output device 2000 may be a display screen.

The memory 4000 may be a high-speed RAM memory or a non-volatile memory, such as a magnetic disk memory. The memory 4000 is configured to store a set of program codes. The input device 1000, the output device 2000 and the processor 3000 are configured to call program codes stored in the memory 4000, and to perform the following operations of: receiving a search request sent by a mobile terminal, the search request including a target search word; searching in a preset application library based on a first search algorithm and the target search word, so as to obtain a first search result set; when a conversion rate of the first search result set is lower than a first preset threshold, searching in the preset application library based on a second search algorithm and the target search word, so as to obtain a second search result set; performing a merge according to the first search result set and the second search result set, so as to obtain a third search result set; and pushing the third search result set to the mobile terminal and instructing the mobile terminal to display the third search result set on a display interface of the mobile terminal.

Alternatively, in terms of performing the merge according to the first search result set and the second search result set, so as to obtain the third search result set, the following operations are implemented, including: selecting first N search results from the first search result set, N being a positive integer; selecting first M search results from the second search result set, M being a positive integer; and determining a union of the N search results and the M search results, so as to obtain the third search result set.

Alternatively, in terms of performing the merge according to the first search result set and the second search result set, so as to obtain the third search result set, the following operations are implemented, including: determining an intersection between the first search result set and the second search result set, so as to obtain the P search results, P being a positive integer; determining Q search results each having a conversion rate higher than a second preset threshold and excluded from the P search results, Q being a positive integer; and determining the P search results and the Q search results as the third search result set.

Alternatively, in terms of pushing the third search result set to the mobile terminal and instructing the mobile terminal to display the third search result set on the display interface of the mobile terminal, the following operations are implemented, including: determining a conversion rate and a weight value of each search result set in the third search result set; calculating a target conversion rate for each search result set based on the conversion rate and the weight value of each search result set in the third search result set, so as to obtain the plurality of target conversion rates; determining a display order of the third search result set based on the plurality of target conversion rates; and pushing the display order and the third search result set to the mobile terminal and instructing the mobile terminal to display the third search result set on the display interface according to the display order.

Alternatively, in terms of searching in the preset application library based on the first search algorithm and the target search word, the following operations are implemented, including: determining an associated word corresponding to the target search word; forming a search word set with the target search word and the associated word; and searching in the preset application library based on the first search algorithm and the search word set.

Alternatively, the following operations may be further implemented, including: when a number of intersections between the first search result set and the second search result set is less than a third preset threshold, sending alarm information to a designated mailbox, the alarm information including the target search word.

Alternatively, the following operations may be further implemented, including: when the search result i in the third search result set is downloaded, associating the target search word with an associated search word corresponding to the search result i, so as to prompt the user to search based on the associated search word when the target search word appears again, the search result i being any search result in the third search result set.

Alternatively, the second search algorithm is a search algorithm of a third-party application.

Alternatively, the conversion rate of the first search result set is an average value or a maximum value of conversion rates of first K search results in the first search result set, K being a positive integer.

An embodiment of the present disclosure also provides a computer storage medium. The computer storage medium stores a computer program for electronic data exchange, and the computer program causes a computer to execute a part or all of the steps of any resource search method as described in the foregoing method embodiments.

An embodiment of the present disclosure also provides a computer program product. The computer program product includes a non-transitory computer readable storage medium storing a computer program. The computer program is operable to cause a computer to execute a part or all of the steps of any resource search method as described in the foregoing method embodiments.

It should be noted that, in order to simplify description the present disclosure, embodiments of the present disclosure are expressed as a series of action combinations, but it would be appreciated by those skilled in the art that the present disclosure is not limited to the order of the actions, because some steps may be executed in other orders or be executed at the same time. In addition, it would be further appreciated by those skilled in the art that embodiments described in the specification are preferred embodiments, actions and modules involved therein may not be necessary for the present disclosure.

In above embodiments, descriptions of respective embodiments are emphasized differently, and parts that are not detailed in some embodiments can refer to relevant descriptions of other embodiments.

In several embodiments provided by the present disclosure, it should be understood that, the system, devices and method disclosed in several embodiments provided by the present disclosure can be realized in any other manner. For example, the device embodiments described above can be merely illustrative, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It would be understood by those skilled in the art that all or a part of the steps carried by the method in the above-described embodiments may be completed by relevant hardware instructed by a program. The program may be stored in a computer readable storage device. The storage device may include: a flash disk, a read-only memory (ROM), a random access memory (RAM), a magnetic disk, an optical disk, or the like.

The embodiments of the present disclosure have been described in detail in the above description. Several specific examples are used to explain the principles and implementation of the present disclosure. The above description of the embodiments is only used to facilitate understanding of the method and the core concept of the present disclosure. At the same time, those skilled in the art may change the specific implementation and application scope according to the concept of the present disclosure. In summary, the content of the present disclosure should not be construed as a limitation on the present disclosure.

What is claimed is:

1. A method of resource search, comprising:
   receiving a search request sent by a mobile terminal, the search request comprising a target search word;
   obtaining a first search result set by searching in a preset application library based on a first search algorithm and the target search word;
   when a conversion rate of the first search result set is lower than a first preset threshold, obtaining a second search result set by searching in the preset application library based on the target search word and a second search algorithm different from the first search algorithm, wherein the first search algorithm and the second search algorithm are configured to obtain different search results based on different orders, wherein the conversion rate of the first search result set is a value calculated from conversion rates of search results in the first search result set, wherein each search result is an application resource in a software store, and wherein the conversion rate of the search result is a ratio of a number of downloaded times of an application to a number of search times of the application;
   obtaining a third search result set by performing a merge according to the first search result set and the second search result set; and
   pushing the third search result set to the mobile terminal and instructing the mobile terminal to display the third search result set on a display interface of the mobile terminal,
   wherein obtaining the third search result set by performing the merge according to the first search result set and the second search result set comprises:
      obtaining P search results by determining an intersection of the first search result set and the second search result set, P being a positive integer;
      determining, in the second search result set, Q search results each having a conversion rate higher than a second preset threshold and excluded from the P search results, Q being a positive integer; and
      determining the third search result set, wherein the third search result set includes the P search results and the Q search results.

2. The method of claim 1, wherein pushing the third search result set to the mobile terminal and instructing the mobile terminal to display the third search result set on the display interface of the mobile terminal comprises:
   determining a conversion rate and a weight value of each search result set in the third search result set, wherein different weight values are set in advance for different search algorithms;
   obtaining a plurality of target conversion rates by calculating a target conversion rate for each search result set based on the conversion rate and the weight value of each search result set in the third search result set;
   determining a display order of the third search result set based on the plurality of target conversion rates; and
   pushing the display order and the third search result set to the mobile terminal and instructing the mobile terminal to display the third search result set on the display interface according to the display order.

3. The method of claim 1, wherein searching in the preset application library based on the first search algorithm and the target search word comprises:
   determining an associated word corresponding to the target search word;
   forming a search word set with the target search word and the associated word; and
   searching in the preset application library based on the first search algorithm and the search word set.

4. The method of claim 1, further comprising:
   when a number of intersections between the first search result set and the second search result set is less than a third preset threshold, sending alarm information to a designated mailbox, the alarm information comprising the target search word.

5. The method of claim 1, further comprising:
   when a search result i in the third search result set is downloaded, associating the target search word with an associated search word corresponding to the search result i; and
   prompting a user to search based on the associated search word when the target search word appears again, the search result i being any search result in the third search result sets, wherein the associated search word corresponding to the search result i comprises a near-synonym, a synonym, or an associative word of the search result i.

6. The method of claim 1, wherein the second search algorithm is a search algorithm of a third-party application.

7. The method of claim 1, wherein the conversion rate of the first search result set is an average value or a maximum value of conversion rates of first K search results in the first search result set, K being a positive integer.

8. The method of claim 1, further comprising:
when the conversion rate of the first search result set is greater than or equal to the first preset threshold, pushing the first search result set to the mobile terminal and instructing the mobile terminal to display the first search result set on a display interface of the mobile terminal.

9. The method of claim 2, wherein calculating the target conversion rate for each search result set based on the conversion rate and the weight value of each search result set in the third search result set comprises:
calculating a target conversion rate for each search result in the third search result set based on a conversion rate and a weight value of each search result; and
for each search result set in the third search result set, determining an average value or a maximum value of conversion rates of first K search results in the search result set as the target conversion rate for the search result set, K being a positive integer.

10. The method of claim 9, wherein calculating the target conversion rate for each search result in the third search result set based on the conversion rate and the weight value of each search result comprises:
when the search result is not contained in an intersection between the first search result set and the second search result set, calculating the target conversion rate for the search result according to a formula of $Rate_{target} = Weight_1 * Rate_1$; and
when the search result is contained in an intersection between the first search result set and the second search result set, calculating the target conversion rate for the search result according to a formula of $Rate_{target} = (Weight_1 * Rate_1 + Weight_2 * Rate_2)/2$;
where $Rate_{target}$ represents the target conversion rate for the search result, $Weight_1$ represents the weight value of the search result corresponding to the first search algorithm, $Rate_1$ represents the conversion rate of the search result corresponding to the first search algorithm, $Weight_2$ represents the weight value of the search result corresponding to the second search algorithm, $Rate_2$ represents the conversion rate of the search result corresponding to the second search algorithm.

11. The method of claim 3, wherein determining the associated word corresponding to the target search word comprises:
performing an identification on the target search word to obtain a target key word; and
determining the associated word based on a mapping relationship between target key words and associated words.

12. A server, comprising: a processor and a memory; and one or more programs stored in the memory and configured to be executed by the processor, the one or more programs comprising instructions applied to a method comprising:
receiving a search request sent by a mobile terminal, the search request comprising a target search word;
obtaining a first search result set by searching in a preset application library based on a first search algorithm and the target search word;
when a conversion rate of the first search result set is lower than a first preset threshold, obtaining a second search result set by searching in the preset application library based on the target search word and a second search algorithm different from the first search algorithm, wherein the first search algorithm and the second search algorithm are configured to obtain different search results based on different orders, wherein the conversion rate of the first search result set is a value calculated from conversion rates of search results in the first search result set, wherein each search result is an application resource in a software store, and wherein the conversion rate of the search result is a ratio of a number of downloaded times of an application to a number of search times of the application;
obtaining a third search result set by performing a merge according to the first search result set and the second search result set; and
pushing the third search result set to the mobile terminal and instructing the mobile terminal to display the third search result set on a display interface of the mobile terminal,
wherein obtaining the third search result set by performing the merge according to the first search result set and the second search result set comprises:
obtaining P search results by determining an intersection of the first search result set and the second search result set, P being a positive integer;
determining, in the second search result set, Q search results each having a conversion rate higher than a second preset threshold and excluded from the P search results, Q being a positive integer; and
determining the third search result set, wherein the third search result set includes the P search results and the Q search results.

13. The server of claim 12, wherein pushing the third search result set to the mobile terminal and instructing the mobile terminal to display the third search result set on the display interface of the mobile terminal comprises:
determining a conversion rate and a weight value of each search result set in the third search result set, wherein different weight values are set in advance for different search algorithms;
obtaining a plurality of target conversion rates by calculating a target conversion rate for each search result set based on the conversion rate and the weight value of each search result set in the third search result set;
determining a display order of the third search result set based on the plurality of target conversion rates; and
pushing the display order and the third search result set to the mobile terminal and instructing the mobile terminal to display the third search result set on the display interface according to the display order.

14. The server of claim 12, wherein searching in the preset application library based on the first search algorithm and the target search word comprises:
determining an associated word corresponding to the target search word;
forming a search word set with the target search word and the associated word; and
searching in the preset application library based on the first search algorithm and the search word set.

15. The server of claim 12, wherein the method further comprises:
when a number of intersections between the first search result set and the second search result set is less than a third preset threshold, sending alarm information to a designated mailbox, the alarm information comprising the target search word.

16. A non-transitory computer readable storage medium, configured to store a computer program, wherein the computer program causes a computer to execute a method comprising:

receiving a search request sent by a mobile terminal, the search request comprising a target search word;

obtaining a first search result set by searching in a preset application library based on a first search algorithm and the target search word;

when a conversion rate of the first search result set is lower than a first preset threshold, obtaining a second search result set by searching in the preset application library based on the target search word and a second search algorithm different from the first search algorithm, wherein the first search algorithm and the second search algorithm are configured to obtain different search results based on different orders, wherein the conversion rate of the first search result set is a value calculated from conversion rates of search results in the first search result set, wherein each search result is an application resource in a software store, and wherein the conversion rate of the search result is a ratio of a number of downloaded times of an application to a number of search times of the application;

obtaining a third search result set by performing a merge according to the first search result set and the second search result set; and pushing the third search result set to the mobile terminal and instructing the mobile terminal to display the third search result set on a display interface of the mobile terminal, wherein obtaining the third search result set by performing the merge according to the first search result set and the second search result set comprises:

obtaining P search results by determining an intersection of the first search result set and the second search result set, P being a positive integer;

determining, in the second search result set, Q search results each having a conversion rate higher than a second preset threshold and excluded from the P search results, Q being a positive integer; and determining the third search result set, wherein the third search result set includes the P search results and the Q search results.

\* \* \* \* \*